US012596107B1

(12) United States Patent
Cummings et al.

(10) Patent No.: US 12,596,107 B1
(45) Date of Patent: Apr. 7, 2026

(54) METHOD FOR NONDESTRUCTIVE EVALUATION USING ULTRASONIC EXCITATION AND ROTATION OF THE INSPECTION OBJECT OR INSPECTION SYSTEM

(71) Applicant: Triad National Security, LLC, Los Alamos, NM (US)

(72) Inventors: Ian Thomas Cummings, Los Alamos, NM (US); Adam Joseph Wachtor, Los Alamos, NM (US); Eric Brian Flynn, Los Alamos, NM (US); Erica Marie Jacobson, Los Alamos, NM (US)

(73) Assignee: Triad National Security, LLC, Los Alamos, TX (US)

( * ) Notice: Subject to any disclaimer, the term of this patent is extended or adjusted under 35 U.S.C. 154(b) by 389 days.

(21) Appl. No.: 18/208,667

(22) Filed: Jun. 12, 2023

(51) Int. Cl.
G01N 29/44 (2006.01)
G01N 29/04 (2006.01)
G01N 29/26 (2006.01)

(52) U.S. Cl.
CPC ....... G01N 29/4445 (2013.01); G01N 29/045 (2013.01); G01N 29/26 (2013.01); G01N 2291/0289 (2013.01)

(58) Field of Classification Search
CPC .......... G01N 29/26; G01N 2291/0289; G01N 29/045; G01N 29/4445
See application file for complete search history.

(56) References Cited

U.S. PATENT DOCUMENTS

| | | | | |
|---|---|---|---|---|
| 4,599,900 A | * | 7/1986 | Friedman | G01N 29/26 |
| | | | | 73/622 |
| 6,813,950 B2 | * | 11/2004 | Glascock | G01N 29/28 |
| | | | | 73/633 |
| 9,080,951 B2 | * | 7/2015 | Habermehl | G01N 29/26 |
| 10,444,202 B2 | | 10/2019 | Flynn et al. | |
| 2013/0312529 A1 | * | 11/2013 | Park | G01H 9/00 |
| | | | | 73/657 |
| 2015/0300995 A1 | * | 10/2015 | Flynn | G01N 29/2418 |
| | | | | 73/602 |
| 2021/0041352 A1 | | 2/2021 | Flynn et al. | |

* cited by examiner

*Primary Examiner* — Jennifer Bahls
(74) *Attorney, Agent, or Firm* — ALSTON & BIRD LLP

(57) ABSTRACT
Embodiments provide for nondestructive defect detection. Example embodiments provide for generating one or more excitation signals using one or more excitation devices coupled to a device under inspection, scanning an exterior surface of the device under inspection to collect sensor signals, and determining, based at least in part on the sensor signals, a presence or lack of a defect in the device under inspection. Either the device under inspection is rotated about an axis for a duration of the scanning or the scanning system is rotated around the device under inspection for the duration of the scanning.

20 Claims, 9 Drawing Sheets

Example of Detected Flaws

ASSESS Local Wavenumber Anomaly - 69 kHz

Wavefield visualization using LiDAR scan of COPV

Defects considered detected highlighted with arrows

METHOD FOR NONDESTRUCTIVE EVALUATION USING ULTRASONIC EXCITATION AND ROTATION OF THE INSPECTION OBJECT OR INSPECTION SYSTEM

STATEMENT REGARDING GOVERNMENT SUPPORT

This invention was made with U.S. Government support under Agreement No. 89233218CNA000001 awarded by the Department of Energy to Triad National Security, LLC. The government has certain rights in the invention.

BACKGROUND

Composite overwrapped pressure vessels (COPVs) are lightweight tanks constructed by wrapping a tank liner (typically metal or plastic) with a composite matrix to increase the maximum pressure it can store. Due to manufacturing defects, impact damage, and loads to the system incurred during service, delaminations can occur between the layers of the composite or between the liner and the composite. These delaminations are often invisible from the exterior of the tank and can cause the tank to rupture. As these tanks are typically used to store contents under high pressure (e.g., rocket fuel or hydrogen for fuel cells), a rupture could lead to catastrophic explosions and even potential loss of life.

Through applied effort, ingenuity, and innovation, many of these identified problems have been solved by developing solutions that are included in embodiments of the present disclosure, many examples of which are described in detail herein.

SUMMARY

Embodiments provide for nondestructive defect detection. Example systems include one or more excitation devices, where the one or more excitation devices are couplable to a device under inspection and configured to generate one or more excitation signals. Example systems further include a scanning system configured to scan an exterior surface of the device under inspection and to collect sensor signals, where the sensor signals are produced as a result of interactions between the one or more excitation signals and features of the device under inspection, either the device under inspection is rotated about an axis for a duration of the scanning or the scanning system is rotated around the device under inspection for the duration of the scanning, and a presence or lack of a defect in the device under inspection is determined based at least in part on the sensor signals.

In some example systems, the one or more excitation devices comprise acoustic excitation devices or transducers. In some example systems, the one or more excitation signals are each associated with a unique excitation frequency.

Some example systems further include one or more of range finding technology, surface mapping technology, or a light detection and ranging (LiDAR) unit directed toward the device under inspection, where the range finding technology, surface mapping technology, or light detection and ranging (LiDAR) unit is configured to capture a geometry of the device under inspection.

Some example systems are configured to determine, based at least in part on the sensor signals and the geometry of the device under inspection, one or more of a presence or lack of defects, defect locations, defect extent, defect severity, or a defect type associated with the defect present in the device under inspection. The defect type may be delamination between layers of a composite of the device under inspection or delamination between a liner of the device under inspection and the composite of the device under inspection. The defect may not be visible from an exterior of the device under inspection.

Some example systems are configured for detecting differences in wavefield responses captured at the surface of the device under inspection. Detecting differences in the wavefield responses may include determining a first wavenumber spectrum of a first region surrounding a point of interest, determining a second wavenumber spectrum of a second region surrounding the point of interest, and determining local anomalies based on comparing the first wavenumber spectrum to the second wavenumber spectrum. The second region may be larger than the first region.

In some example systems, the scanning system uses Class I and/or Class II lasers.

In some example systems, the device under inspection is free from liquid couplant.

In some example systems, determining, based at least in part on the sensor signals, a presence or lack of one or more of a defect location, a defect extent, a defect severity, and a defect type associated with the defect present in the device under inspection includes converting the sensor signals into a time series, transforming the time series into a wavefield image, aligning the wavefield image to a geometry of the device under inspection, and identifying the defect based on the wavefield image. In some example systems, the geometry of the device under inspection is obtained using a light detection and ranging (LiDAR) unit directed at the device under inspection, via stereo and/or video mapping, or from known digital files.

In some embodiments, the one or more excitation devices comprise one or more of fixturing to which or upon which the device under inspection is mounted or fixturing about or by which the device under inspection is rotated.

Example methods include generating one or more excitation signals using one or more excitation devices, where the one or more excitation devices are coupled to a device under inspection. The methods further include scanning, using a scanning system, an exterior surface of the device under inspection to collect sensor signals, the sensor signals produced as a result of interactions between the one or more excitation signals and features of the device under inspection. Either the device under inspection is rotated about an axis for a duration of the scanning or the scanning system is rotated around the device under inspection for the duration of the scanning. The method further includes determining, based at least in part on the sensor signals, a presence or lack of one or more of a defect location, a defect extent, a defect severity, and a defect type associated with a defect of the device under inspection.

The method can further include capturing a geometry (or surface morphology) of the device under inspection using a light detection and ranging (LiDAR) unit aimed at the device under inspection, either before, during, or after the scanning. The method can then further include determining, based at least in part on the sensor signals and the geometry of the device under inspection, one or more of the defect location, the defect extent, the defect severity, and the defect type associated with the defect present in the device under inspection.

In various embodiments, the one or more excitation devices comprise transducers and the scanning system comprises a laser doppler vibrometer (LDV). In various embodiments, scanning the exterior surface of the device under inspection comprises directing a laser beam from the LDV toward the exterior surface using a reflective device, and the reflective device comprises one or more scanning galvanometer-driven mirrors.

In various embodiments, the method can further include detecting differences in waves measured at the surface associated with the device under inspection by determining a first wavenumber spectrum of a first region surrounding a point of interest, determining a second wavenumber spectrum of a second region surrounding the point of interest, and determining local anomalies based on comparing the first wavenumber spectrum to the second wavenumber spectrum.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
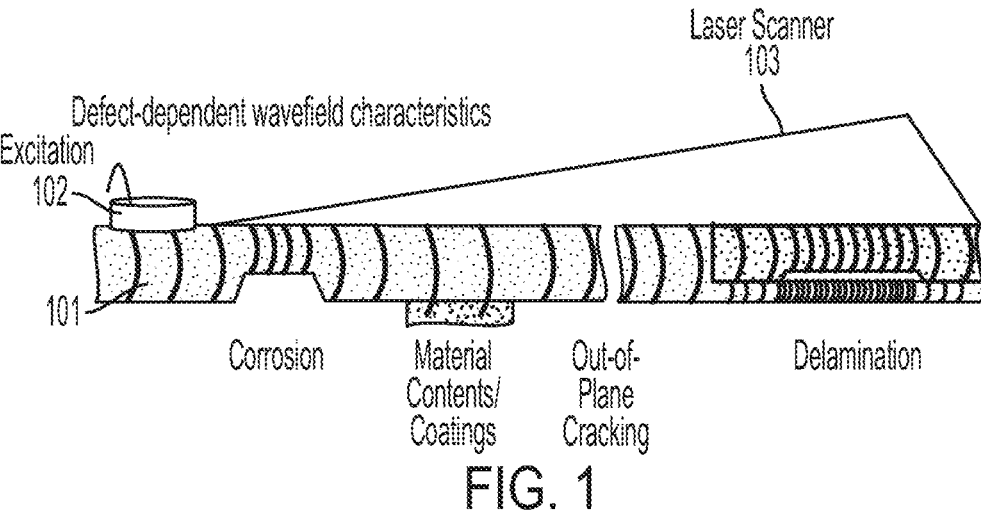

Having thus described the disclosure in general terms, reference will now be made to the accompanying drawings, which are not necessarily drawn to scale, and wherein:

FIG. 1 depicts example ultrasonic inspection.

Figure 2:
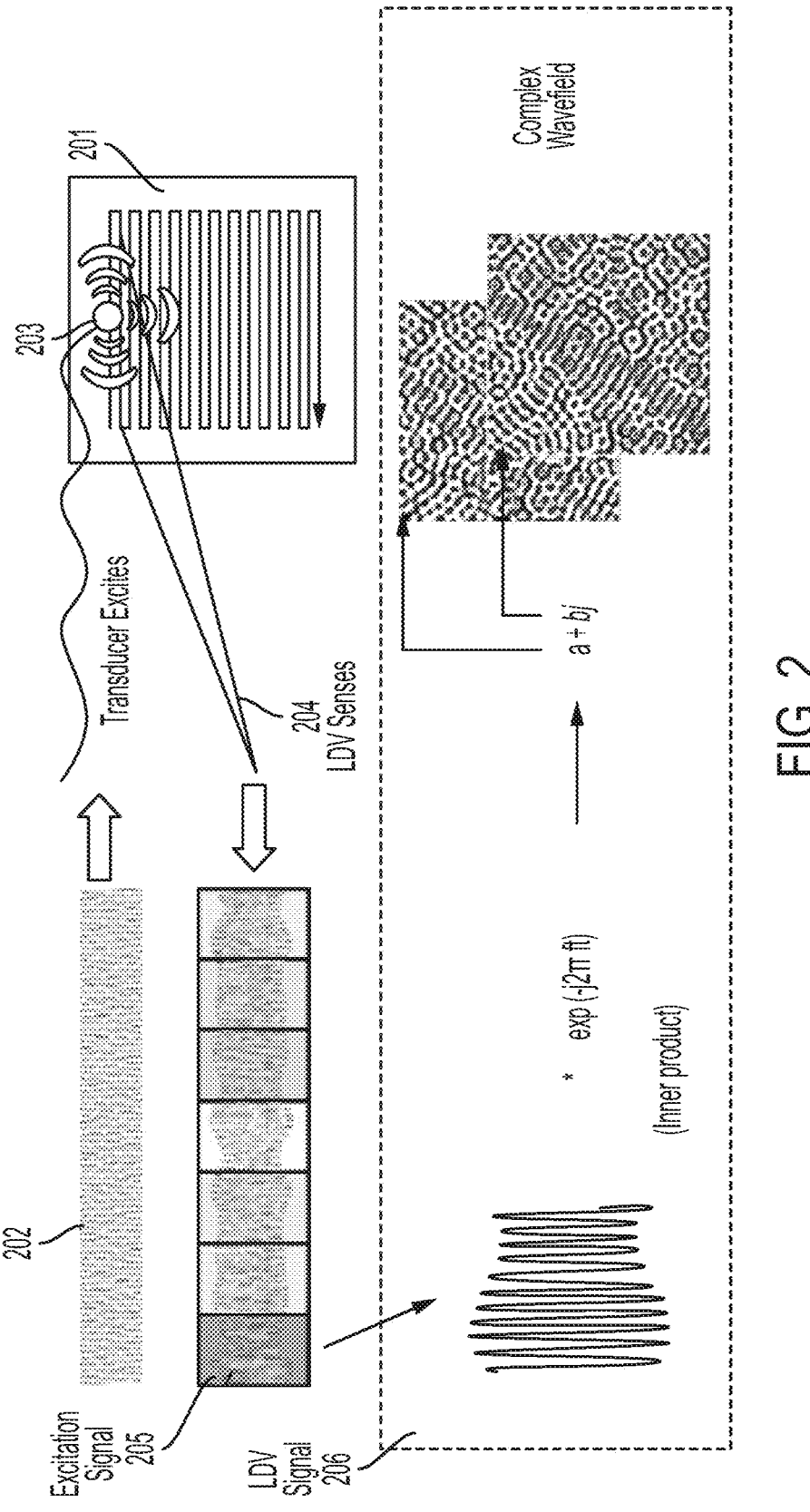

FIG. 2 depicts example operation principles in accordance with embodiments herein.

Figure 3:
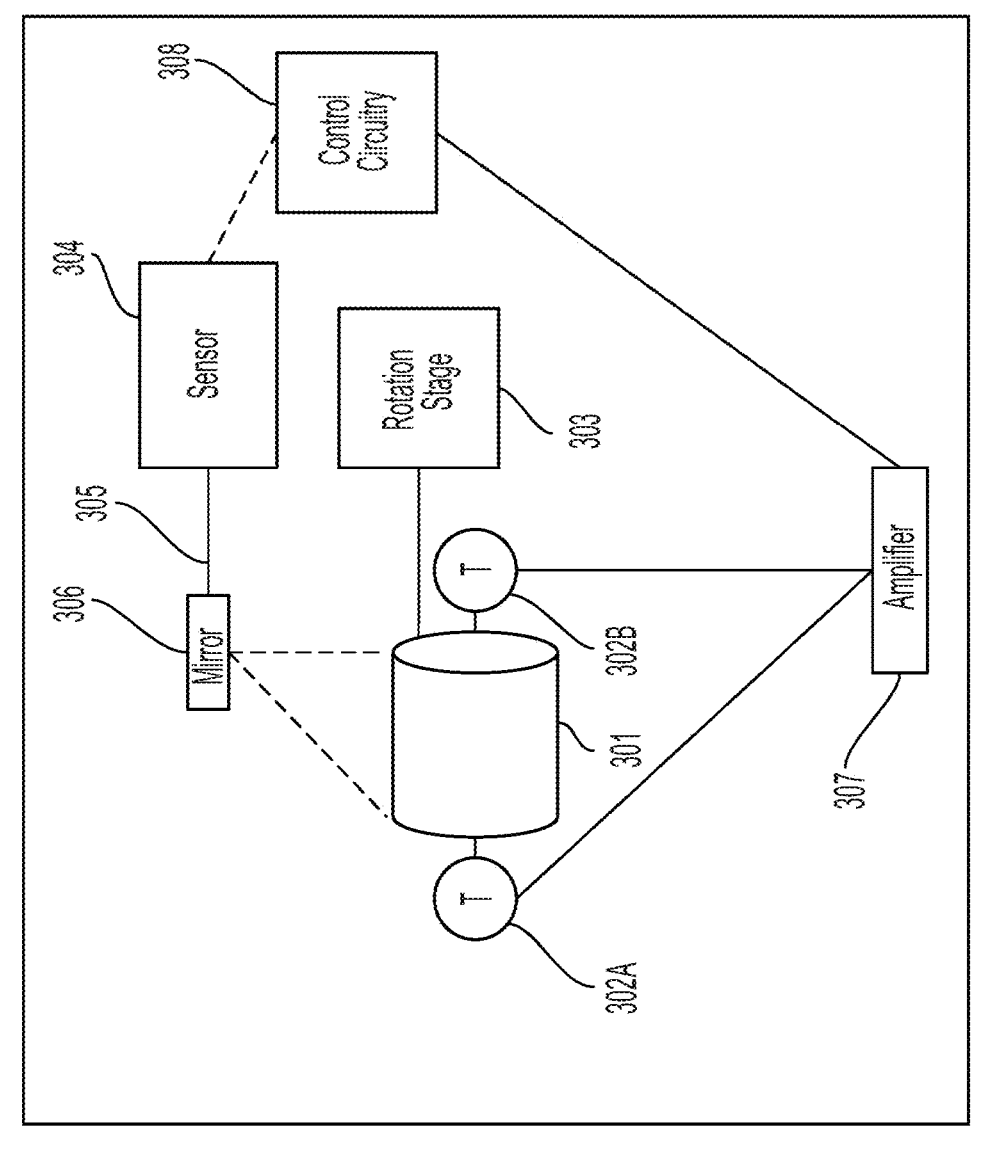

FIG. 3 depicts a schematic of an example nondestructive evaluation system, in accordance with embodiments herein.

Figure 4:
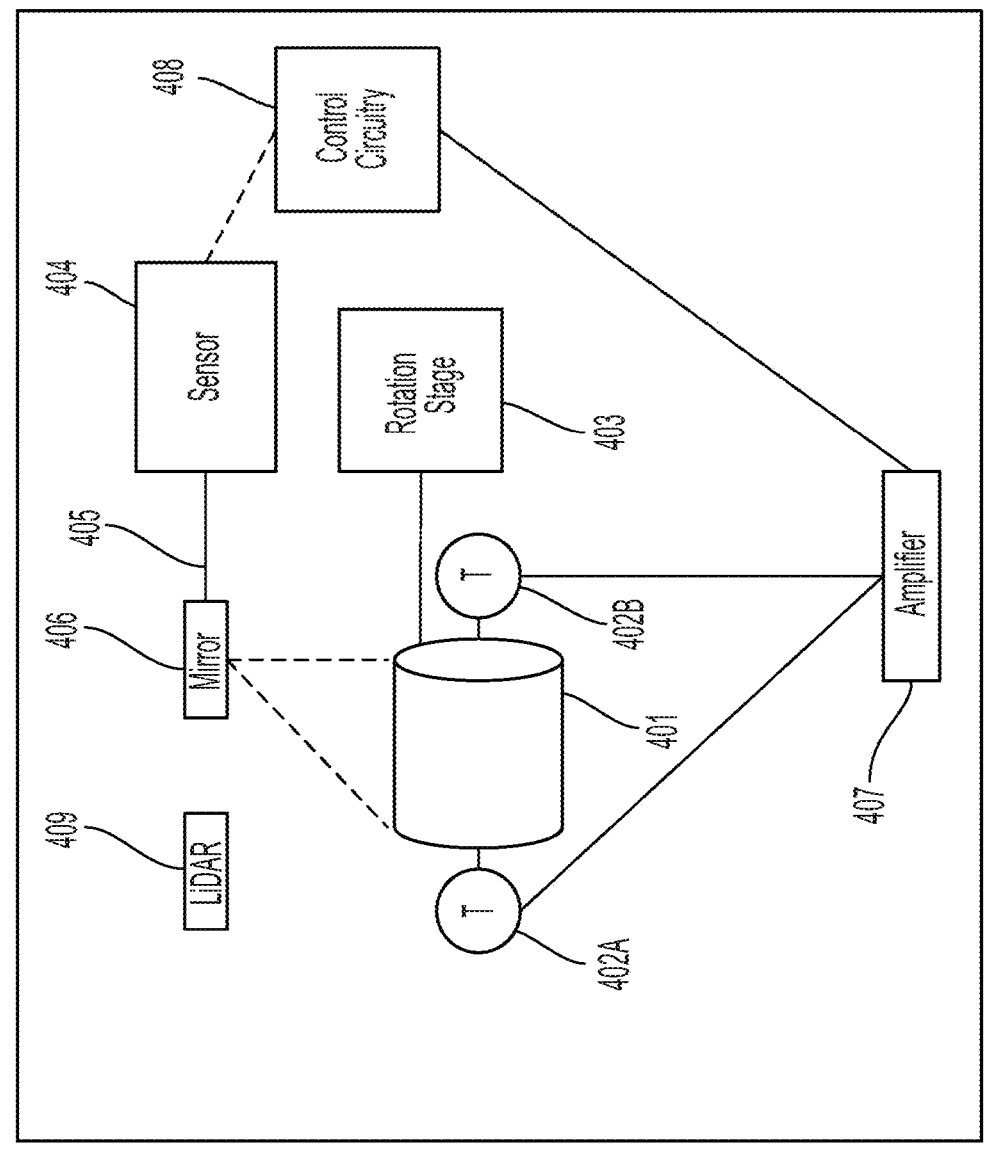
Figure 4:
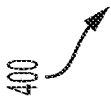

FIG. 4 depicts a schematic of an example nondestructive evaluation system, in accordance with embodiments herein.

Figure 5:
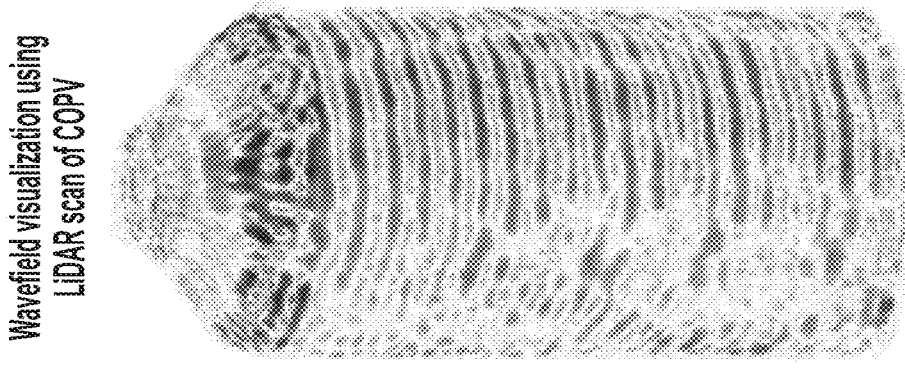

FIG. 5 depicts wavefield visualization using a light detection and ranging (LiDAR) scan of a device under inspection, in accordance with embodiments herein.

Figure 6:
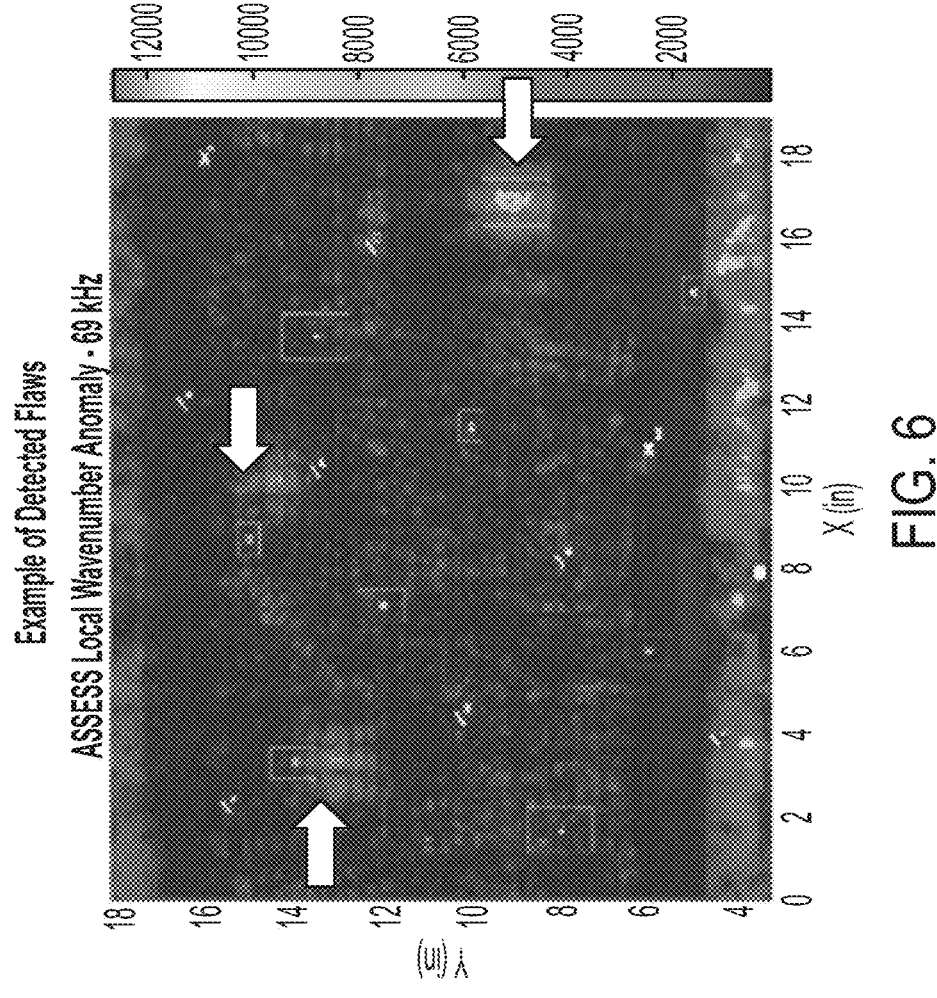

FIG. 6 depicts defects detected using example nondestructive evaluation systems, in accordance with embodiments herein.

Figure 7:
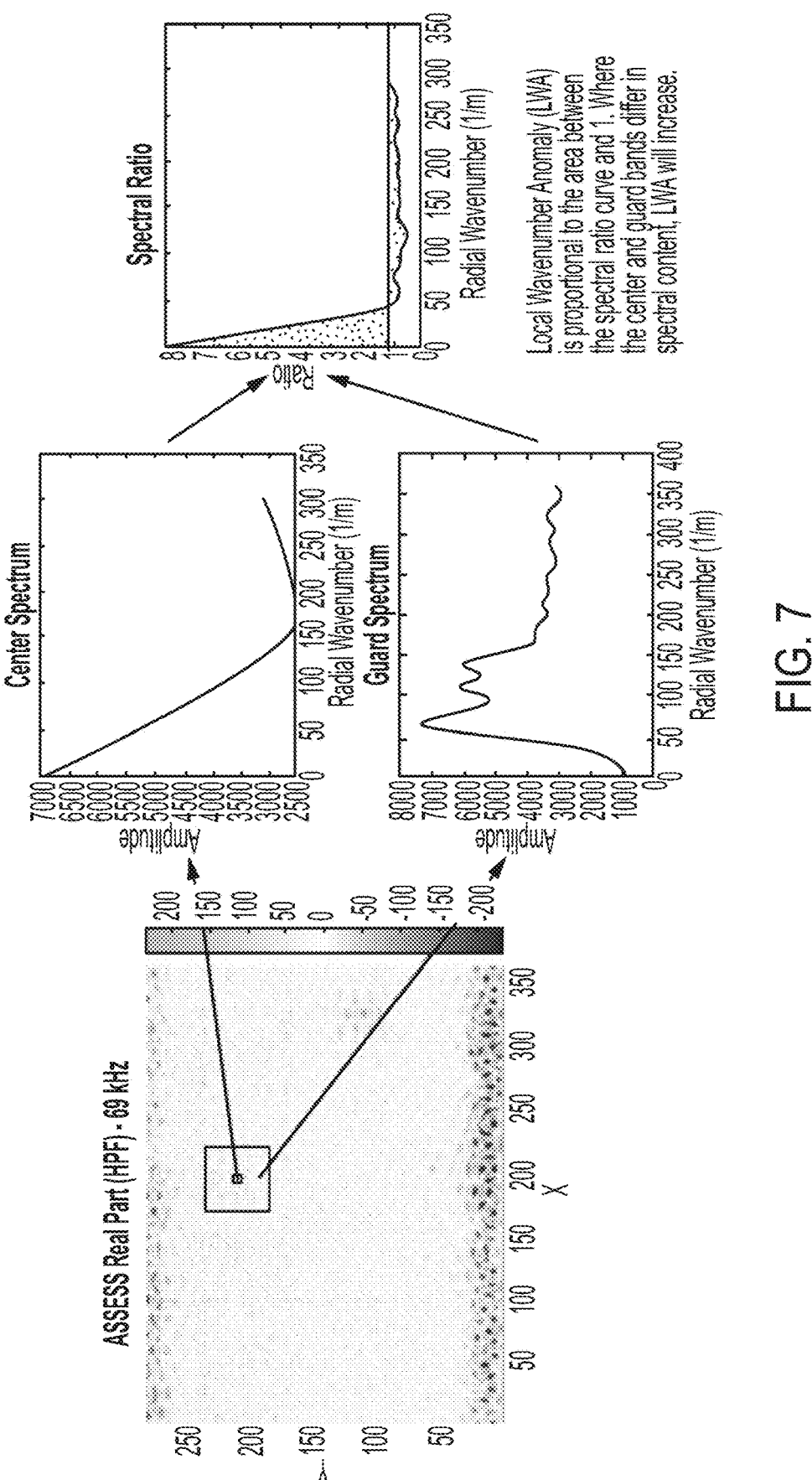

FIG. 7 depicts example local wavenumber anomaly features, using example nondestructive evaluation systems, in accordance with embodiments herein.

Figure 8:
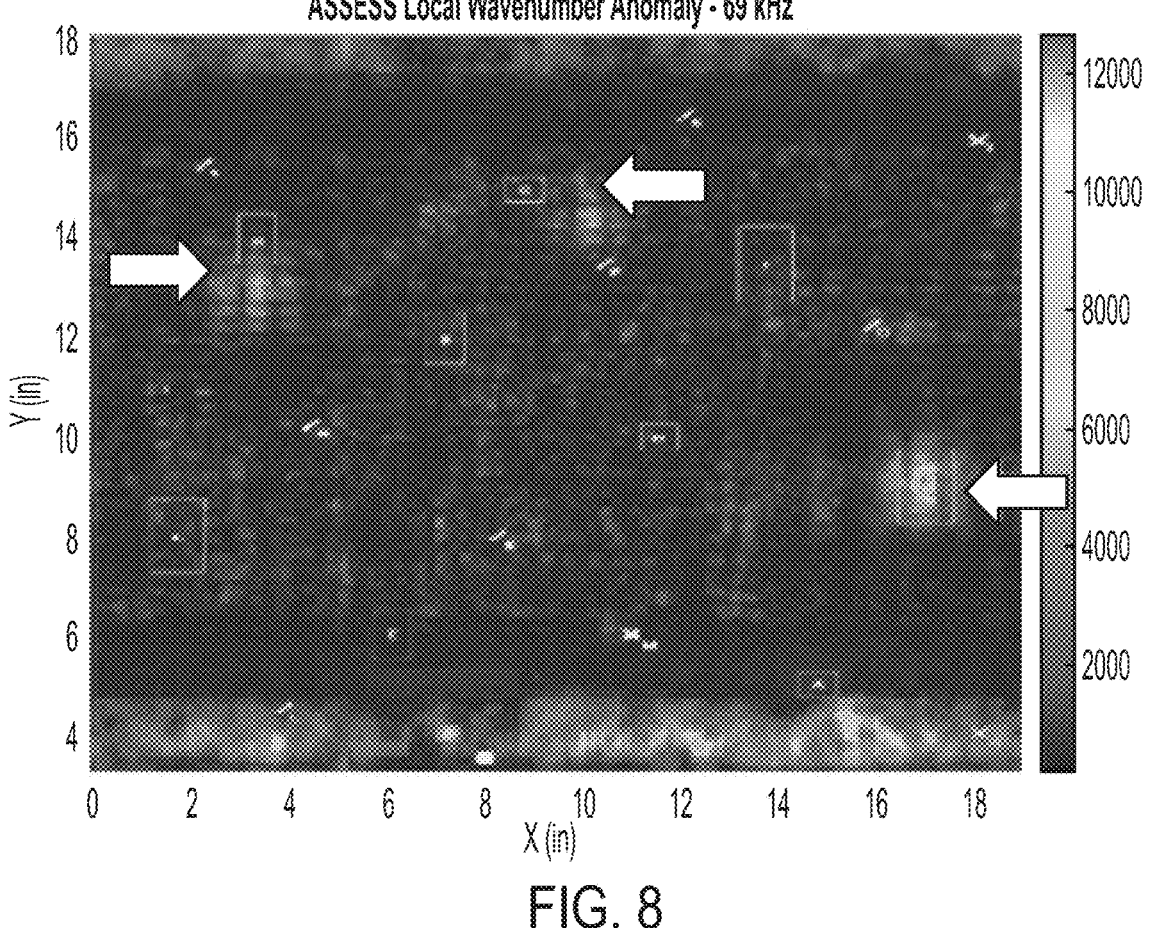

FIG. 8 depicts defects detected using example nondestructive evaluation systems, in accordance with embodiments herein.

Figure 9:
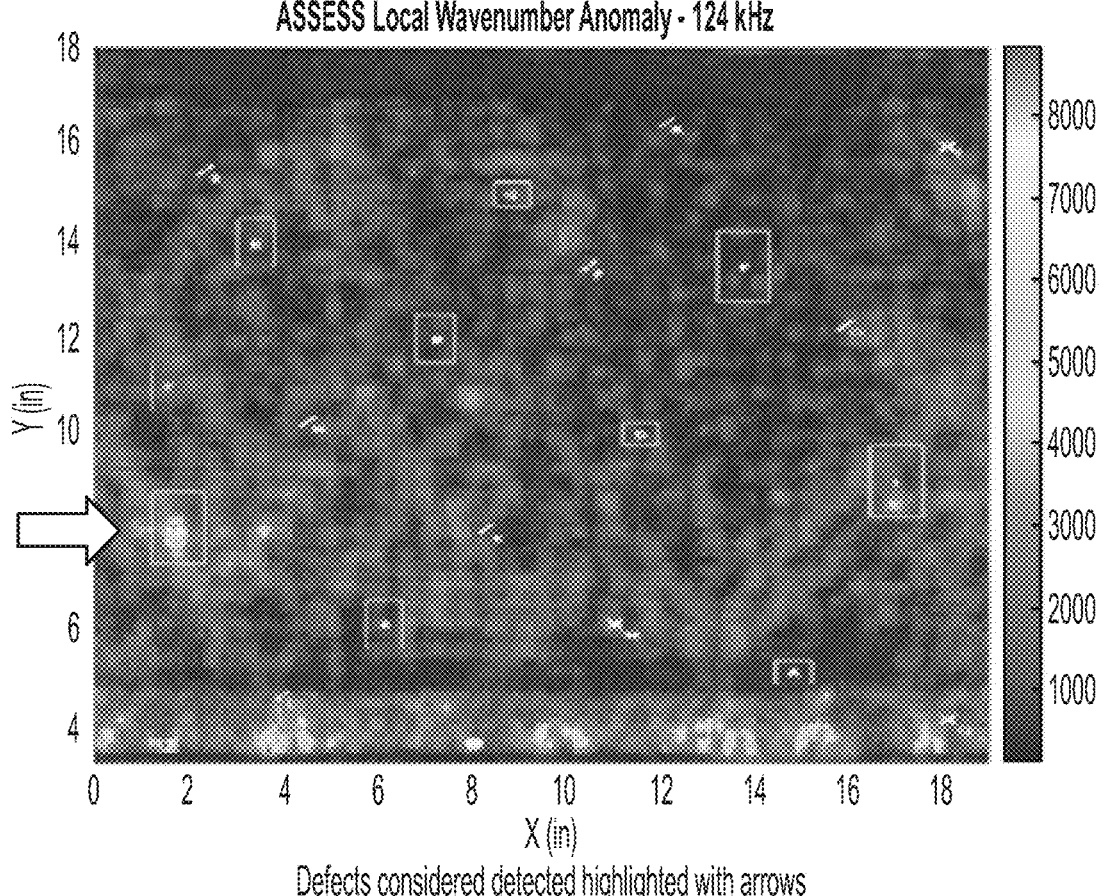

FIG. 9 depicts defects detected using example nondestructive evaluation systems, in accordance with embodiments herein.

Figures 10A, 10B:
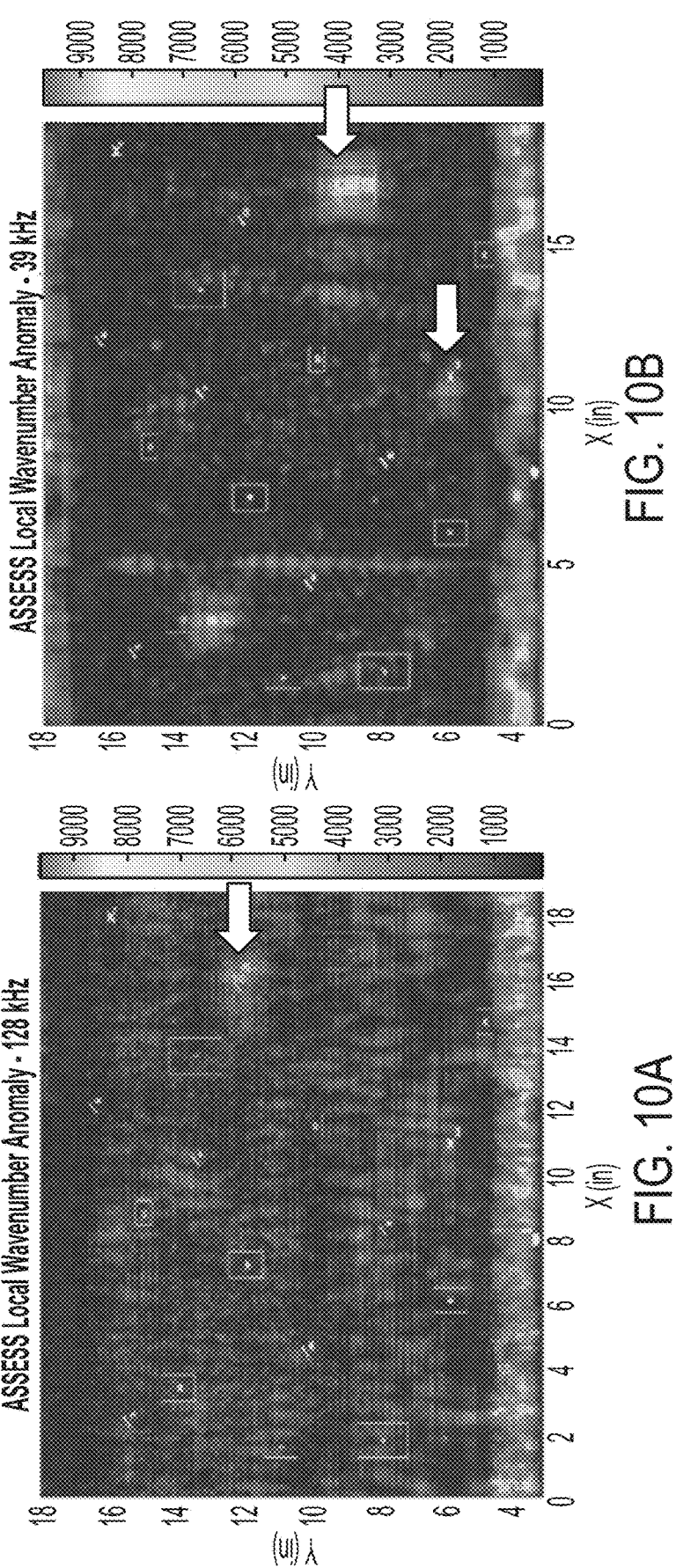

FIGS. 10A and 10B depict defects detected using example nondestructive evaluation systems, in accordance with embodiments herein.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Defects in various devices under inspection, for example compressed overwrapped pressure vessels (COPVs) or water tanks, are often invisible from the exterior of the device and can cause the device to rupture if the goes undetected. For example, COPVs are used to store contents under high pressure (e.g., rocket fuel or hydrogen for fuel cells), and a rupture can lead to catastrophic explosions and even potential loss of life.

Conventional techniques for inspecting such devices, such as shearography (pressure, thermal), thermography, eddy current inspections, laser profilometry, acoustic emissions testing, fiber Bragg gratings, magnetic stress gauges, other integrated sensor systems, and local strain assessments via Raman spectroscopy, suffer drawbacks because they are unable to or are inefficient at actively and mechanically interrogating the material and geometric properties of the device under inspection. Ultrasonic inspection techniques tend to outperform some of these methods, especially in thicker composites, and highlight delaminations that might be difficult for some other methods to detect.

Embodiments herein overcome drawbacks associated with existing evaluation techniques and more. For example, measurements can easily be obtained using embodiments herein. The measurements contain information that can be used to detect the presence and extent of delaminations and potentially the locations of cut composite fibers in the device under inspection. Embodiments herein can provide nondestructive evaluation of rocket fuel tanks, tanks associated with reusable launch vehicles, compressed natural gas tanks, compressed hydrogen tanks (including for fuel cell applications), scuba diving tanks, munitions, and more (e.g., anything that can be rotated or around which embodiments herein may rotate).

Embodiments herein are directed to rapid, full-structure nondestructive evaluation that includes exciting a structure or device under inspection with one or more selected ultrasonic tones from one or more transducers and continuously capturing the wavefield response at the surface of the device under inspection using a scanning system (e.g., a laser doppler vibrometer (LDV)). The evaluation can further include detecting the geometry of the device under inspection using a light detection and ranging (LiDAR) unit or component. That is, in various embodiments, the geometry of the device under inspection can also be captured before, during, or after the ultrasonic measurements using the LiDAR component of the system.

With respect to competing transient ultrasonic techniques, embodiments herein can inject more energy into the structure (e.g., the device under inspection or tank) due to its steady-state excitation paradigm, leading to higher measurement signal-to-noise ratios and significantly faster measurements.

Embodiments herein are designed to accommodate three-dimensional inspections, where the device under inspection is inspected by rotating them through the path of a scanning LDV or by revolving the scanning system about a stationary inspection object. This presents the advantage of capturing the full surface response and geometry of the object in a single measurement-eliminating the need for registration between multiple partial measurements of the inspection object and potentially reducing the cost and time of inspection. Embodiments herein are useful in the inspection of composite overwrapped pressure vessels (COPVs). Embodiments herein can automatically scan the entire circumference of the tank that can accommodate a range of COPV sizes. Embodiments herein are useful in the inspection of other devices and are not limited to COPVs.

In various embodiments, the device under inspection can be placed on a rotation stage and the measurement system performs scans as the device is rotated. In other embodiments, the device under inspection is fixed in place and the measurement system rotates around the device, either on a track system or robotic carrier. Both examples eliminate the need for the device under inspection to be rotationally symmetric, as the geometry information collected via LiDAR can be used to build a model of the device under inspection and to inform the analysis of the wavefield response captured at the surface of the device under inspection.

Embodiments herein further provide defect detection based on analysis of the wavefield response captured at the surface. Some embodiments herein determine the presence and type of defect associated with a device under inspection based on local wavenumber estimation. Such a technique leverages the idea that reductions in thickness and delaminations in a material create local changes in the stiffness of the material which lead to changes in the spatial frequency (wavenumber) of the waves observed at the surface. However, difficulties sometimes arise using local wavenumber estimation with respect to detecting small delaminations due to the natural variability of the composite structure of the device under inspection.

In order to improve the robustness of the defect detections, embodiments herein may employ a novel damage indication feature called local wavenumber anomaly (LWA). The LWA metric compares the wavenumber spectrum of a small region surrounding a point of interest to the wavenumber spectrum of a larger reference region surrounding the point of interest, allowing suppression of larger natural variations in the response of the device under inspection while highlighting local anomalies. In some embodiments, the local amplitude and/or phase information of a wavefield at one or more of the excited frequencies can be used to highlight defects (e.g., according to multi-tone excitation linear/non-linear inspection techniques).

Additional improvements enabled by embodiments presented herein include provision of geo-temporal information associated with defects or other surface characteristics of a device under inspection. That is, multiple scans of a device under inspection (e.g., whether the device or the scanning system is rotating) provide for several snapshots over time of the surface of the device under inspection. Evaluation of the data obtained over time provides valuable insight into the condition or development of defects over time.

FIG. 1 depicts example ultrasonic inspection. Shown in FIG. 1, a device under inspection 101 may be subjected to some form of excitation 102, such that various defects (e.g., corrosion, hidden corrosion, coatings, out-of-plane cracking, delamination) may be detected using a laser scanner 103 (e.g., or other suitable means for measuring). The laser scanner 103 records vibration signatures detectable due to the excitation 102, and the signatures may be evaluated to determine the presence, location, extent, severity, and type of defect associated with the device under inspection 101.

FIG. 2 depicts example operation principles in accordance with embodiments herein. Shown in FIG. 2, one or more excitation signals 202 are generated by one or more transducers 203 coupled to a device under inspection 201. A laser scanner 204 (e.g., a laser doppler vibrometer or LDV) scans the exterior of the device under inspection 201 and senses or measures signals 205 produced as a result of the excitation of the device under inspection 201. The signal(s) 205 sensed or measured by the LDV 204 can be processed 206 (e.g., converted from time series data to a surface response) to assist with determining the presence and type of defect associated with the device under inspection 201.

FIG. 3 depicts a schematic of an example nondestructive evaluation system 300, in accordance with embodiments herein. In embodiments, a nondestructive evaluation system 300 includes a device under inspection 301 (e.g., COPV tank) having one or more transducers (302A, 302B) mounted thereto (e.g., mounted to threaded pressure fittings (not shown) on either end of the device under inspection 301 (e.g., COPV tank)). In other examples, the transducers may be mounted or attached using clamps, clamping systems, straps, wax, adhesives, and/or the like. The transducers 302A, 302B, controllable by control circuitry 308, can excite the exterior of the device under inspection 301 according to one or more excitation frequencies.

The nondestructive evaluation system 300 further includes a rotation stage 303 which may be centered on the device under inspection's 301 primary axis so that the rotation stage 303 (e.g., digitally controlled using control circuitry 308) can cause the device under inspection 301 to rotate. A sensor (e.g., laser doppler vibrometer) 304 (e.g., also controlled using control circuitry 308) is directed at the device under inspection's 301 surface (e.g., along the primary axis) using one or more scanning galvanometer-driven mirrors 306 (e.g., the laser 305 from sensor 304 is directed toward the device under inspection's 301 surface). An RF amplifier 307 is optionally incorporated.

It will be appreciated that, while the depicted example includes a mirror and scanning along a primary axis, multiple mirrors may be used within the scope of the present disclosure. Moreover, incorporating 2-dimensional scanning of sections of the device under inspection between separate rotations is within the scope of the present disclosure. Further, while the depicted example includes the sensor above the tank or device under inspection, the sensor can be positioned relative to the device under inspection in other configurations.

FIG. 4 depicts a schematic of an example nondestructive evaluation system 400, in accordance with embodiments herein. In embodiments, a nondestructive evaluation system 400 includes a device under inspection 401 (e.g., COPV tank) having one or more transducers (402A, 402B) mounted to threaded pressure fittings (not shown) on either end of the device under inspection 401 (e.g., COPV tank). In other examples, the transducers may be mounted or attached using clamps, clamping systems, straps, wax, adhesives, and/or the like. The transducers 402A, 402B, controlled by control circuitry 408, can excite the exterior of the device under inspection 401 according to one or more excitation frequencies.

The nondestructive evaluation system 400 further includes a rotation stage 403 that may be centered on the device under inspection's 401 primary axis so that the rotation stage 403 (e.g., digitally controlled using control circuitry 408) can cause the device under inspection 401 to rotate. A sensor (e.g., laser doppler vibrometer) 404 (e.g., also controlled using control circuitry 408) is directed at or toward the device under inspection's 401 surface (e.g., along the primary axis) using one or more scanning galvanometer-driven mirrors 406 (e.g., the laser 405 from sensor 404 is directed toward the device under inspection's 401 surface). An RF amplifier 407 is optionally incorporated.

In embodiments, a LiDAR unit 409 is also directed toward the device under inspection 401 to allow it to collect the geometry of the device under inspection 401 as well. The geometry (or surface morphology) of the device under inspection 401 can then be correlated with the excitation response measured using the sensor 404 to identify defects. That is, the sensor signals obtained using the sensor 404 can be converted into a time series, and the time series can be transformed into a wavefield image. The wavefield image can be aligned to the geometry, and defects can be identified based on analysis of the wavefield image or the time series data.

The geometry of the device under inspection can be obtained using the LiDAR unit (or other surface mapping technology), via stereo and/or video mapping, or from known digital files.

It will be appreciated that the sensitivities of the sensor or scanning device 404 and the LiDAR unit 409 are sufficiently different so as to not interfere with data obtained in conjunction with either device. That is, a LiDAR unit 409 may have a sensitivity on the order of millimeters to centimeters, while a sensor or scanning device 404 (e.g., LDV) may have a sensitivity on the order of nanometers or microns; accordingly, vibrations for measurement by the sensor or scanning device 404 are not visible to or do not disrupt the accuracy or measurements obtained using the LiDAR unit 409.

It will be appreciated that, while the depicted example includes a mirror and scanning along a primary axis, multiple mirrors may be used within the scope of the present disclosure. Moreover, incorporating 2-dimensional scanning of sections of the device under inspection between separate rotations is within the scope of the present disclosure. Further, while the depicted example includes the sensor above the tank or device under inspection, the sensor can be positioned relative to the device under inspection in other configurations.

It will be appreciated that, while embodiments herein depict and discuss a COPV tank as an example of the device under inspection, nondestructive evaluation of other items is within the scope of the present disclosure. It will further be appreciated that, while embodiments herein may appear to depict a device under inspection positioned horizontally, the orientation of the device under inspection may change in other embodiments without departing from the scope of the present disclosure.

Embodiments herein are configured to produce a full wavefield map containing mechanical response information about the device under inspection which can be processed to locate delaminations and cut fibers (e.g., or other defects associated with various types of devices under inspection). Regions in which wavefield processing algorithms, according to embodiments herein, indicated defect signatures were compared against the known defect locations in the map provided for the device under inspection. Scan rates of 1-1.5 m2/hr were demonstrated, allowing full tank inspection in approximately ten minutes. This scan time represents the time required for inspection with a single excitation frequency, though multiple excitation frequencies may be used (e.g., necessary or not) to detect all defect types. Inspection enabled herein is considerably faster than conventional ultrasonic inspection systems due to the steady-state inspection. Embodiments herein also require no liquid couplant (e.g., used with traditional pulse-echo ultrasonic testing probes) which could damage the tank, and embodiments use only eye safe lasers (e.g., as opposed to laser ultrasonic testing systems).

FIG. 5 depicts wavefield visualization using a LiDAR scan of a device under inspection, in accordance with embodiments herein. FIG. 6 depicts defects detected using example nondestructive evaluation systems, in accordance with embodiments herein.

FIG. 7 depicts example local wavenumber anomaly features, using example nondestructive evaluation systems, in accordance with embodiments herein. As shown in FIG. 7, the LWA metric compares the wavenumber spectrum of a small region surrounding a point of interest to the wavenumber spectrum of a larger reference region surrounding the point of interest, allowing suppression of larger natural variations in the response of the device under inspection while highlighting local anomalies. Local wavenumber anomaly (LWA) is proportional to the area between a spectral ratio curve and 1. Where the center and guard bands differ in spectral content, the local wavenumber anomaly (LWA) metric will increase.

FIG. 8 depicts defects detected using example nondestructive evaluation systems, in accordance with embodiments herein. FIG. 8 depicts local wavenumber anomaly metrics at 69 kHz. A scan boundary artifact occurs in the middle of the figure because the data were registered to a known defect map.

FIG. 9 depicts defects detected using example nondestructive evaluation systems, in accordance with embodiments herein. FIG. 9 depicts local wavenumber anomaly metrics at 124 kHz, and a defect is highlighted with the large arrow.

FIGS. 10A and 10B depict defects detected using example nondestructive evaluation systems, in accordance with embodiments herein. FIG. 10A depicts local wavenumber anomaly metrics at 128 kHz while FIG. 10B depicts local wavenumber anomaly metrics at 39 kHz. Detected defects are highlighted with large arrows.

In FIGS. 6, 8, 10A, and 10B, known defect locations are highlighted with rectangles (delaminations), slashes (fiber cuts) and crosses (fiber cuts). Defects considered detected are highlighted with arrows.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for nondestructive defect detection, the system comprising:

one or more excitation devices, wherein the one or more excitation devices are couplable to a device under inspection and configured to generate one or more excitation signals; and a scanning system configured to scan an exterior surface of the device under inspection and to collect sensor signals, wherein the sensor signals are produced as a result of interactions between the one or more excitation signals and features of the device under inspection, wherein either the device under inspection is rotated about an axis for a duration of the scanning or the scanning system is rotated around the device under inspection for the duration of the scanning, and wherein a presence or lack of a defect in the device under inspection is determined based at least in part on the sensor signals, wherein the system is configured for detecting differences in wavefield responses captured at the exterior surface of the device under inspection, and wherein detecting differences in the wavefield responses comprises:

determining a first wavenumber spectrum of a first region surrounding a point of interest;

determining a second wavenumber spectrum of a second region surrounding the point of interest; and determining local anomalies based on comparing the first wavenumber spectrum to the second wavenumber spectrum.

2. The system of claim 1, wherein the one or more excitation devices comprise acoustic excitation devices.

3. The system of claim 1, wherein the one or more excitation devices comprise transducers.

4. The system of claim 1, wherein the one or more excitation signals are each associated with a unique excitation frequency.

5. The system of claim 1, further comprising one or more of range finding technology, surface mapping technology, or a light detection and ranging (LiDAR) unit directed toward the device under inspection, wherein the range finding technology, the surface mapping technology, or the light detection and ranging (LiDAR) unit is configured to capture a geometry of the device under inspection.

6. The system of claim 5, configured to determine, based at least in part on the sensor signals and the geometry of the device under inspection, a presence or lack of one or more of defect locations, defect extent, defect severity, or a defect type associated with the defect present in the device under inspection.

7. The system of claim 6, wherein the defect type is delamination between layers of a composite of the device under inspection or delamination between a liner of the device under inspection and the composite of the device under inspection.

8. The system of claim 1, wherein the defect is not visible from an exterior of the device under inspection.

9. The system of claim 1, wherein the second region is larger than the first region.

10. The system of claim 1, wherein scanning an entirety of the exterior surface of the device under inspection is associated with a scan rate.

11. The system of claim 1, wherein the device under inspection is free from liquid couplant.

12. The system of claim 1, wherein the scanning system uses Class I and/or Class II lasers.

13. The system of claim 1, wherein determining, based at least in part on the sensor signals, a presence or lack of one or more of a defect location, a defect extent, a defect severity, and a defect type associated with the defect present in the device under inspection comprises:

converting the sensor signals into a time series;

transforming the time series into a wavefield image;

aligning the wavefield image to a geometry of the device under inspection; and identifying the defect based on the wavefield image.

14. The system of claim 13, wherein the geometry of the device under inspection is obtained using a light detection and ranging (LiDAR) unit directed at the device under inspection, via stereo and/or video mapping, or from known digital files.

15. The system of claim 1, wherein the one or more excitation devices are configured to excite the device under inspection through a fixturing coupled to the device under inspection.

16. A system for nondestructive defect detection, the system comprising:

one or more excitation devices, wherein the one or more excitation devices are couplable to a device under inspection and configured to generate one or more excitation signals, wherein the device under inspection is free from liquid couplant; and a scanning system configured to scan an exterior surface of the device under inspection and to collect sensor signals, wherein the sensor signals are produced as a result of interactions between the one or more excitation signals and features of the device under inspection, wherein either the device under inspection is rotated about an axis for a duration of the scanning or the scanning system is rotated around the device under inspection for the duration of the scanning, and wherein a presence or lack of a defect in the device under inspection is determined based at least in part on the sensor signals.

17. The system of claim 16, wherein the one or more excitation devices comprise acoustic excitation devices or transducers.

18. The system of claim 16, wherein the one or more excitation devices are configured to excite the device under inspection through a fixturing coupled to the device under inspection.

19. A system for nondestructive defect detection, the system comprising:

one or more excitation devices, wherein the one or more excitation devices are couplable to a device under inspection and configured to generate one or more excitation signals; and a scanning system configured to scan an exterior surface of the device under inspection and to collect sensor signals, wherein the sensor signals are produced as a result of interactions between the one or more excitation signals and features of the device under inspection, wherein either the device under inspection is rotated about an axis for a duration of the scanning or the scanning system is rotated around the device under inspection for the duration of the scanning, wherein a presence or lack of a defect in the device under inspection is determined based at least in part on the sensor signals, and wherein determining, based at least in part on the sensor signals, a presence or lack of one or more of a defect location, a defect extent, a defect severity, and a defect type associated with the defect present in the device under inspection comprises:

converting the sensor signals into a time series;

transforming the time series into a wavefield image;

aligning the wavefield image to a geometry of the device under inspection; and identifying the defect based on the wavefield image.

20. The system of claim 19, wherein the one or more excitation devices comprise acoustic excitation devices or transducers.

* * * * *